US012248430B2

(12) United States Patent
Capalija et al.

(10) Patent No.: US 12,248,430 B2
(45) Date of Patent: Mar. 11, 2025

(54) OVERLAY LAYER FOR NETWORK OF PROCESSOR CORES

(71) Applicant: Tenstorrent Inc., Toronto (CA)

(72) Inventors: Davor Capalija, Toronto (CA); Ivan Matosevic, Toronto (CA); Jasmina Vasiljevic, Toronto (CA); Utku Aydonat, Toronto (CA); Andrew Lewycky, Toronto (CA); S. Alexander Chin, Toronto (CA); Ljubisa Bajic, Toronto (CA); Alex Cejkov, Toronto (CA); Milos Trajkovic, Toronto (CA)

(73) Assignee: Tenstorrent Inc., Toronto (CA)

( * ) Notice: Subject to any disclaimer, the term of this patent is extended or adjusted under 35 U.S.C. 154(b) by 258 days.

(21) Appl. No.: 17/945,045

(22) Filed: Sep. 14, 2022

(65) Prior Publication Data
US 2023/0041130 A1    Feb. 9, 2023

Related U.S. Application Data

(63) Continuation-in-part of application No. 16/942,492, filed on Jul. 29, 2020, now Pat. No. 11,467,846.
(Continued)

(51) Int. Cl.
G06F 15/78    (2006.01)
G06F 5/01     (2006.01)

(52) U.S. Cl.
CPC ............ *G06F 15/7807* (2013.01); *G06F 5/01* (2013.01)

(58) Field of Classification Search
CPC ............ G06F 15/1735; G06F 15/7807; G06F 15/7825
See application file for complete search history.

(56) References Cited

U.S. PATENT DOCUMENTS 9,658,675 B1 *  5/2017 Witek .................. G06F 1/3293
2008/0181115 A1   7/2008 Soulie et al.
(Continued)

FOREIGN PATENT DOCUMENTS

CN    101171573 A    4/2008
CN    106155814 B    4/2019
EP      2328076 A1    6/2011

OTHER PUBLICATIONS

Summons to Attend Oral Proceedings dated Jul. 8, 2024 from European Application No. 20188876.5, 11 pages.
(Continued)

*Primary Examiner* — Jacob Petranek
(74) *Attorney, Agent, or Firm* — Daylight Law, P.C.

(57) ABSTRACT

Methods and systems related to the efficient execution of complex computations by a multicore processor and the movement of data among the various processing cores in the multicore processor are disclosed. A multicore processor includes a set of processing cores and associated sets of processing pipelines, core controllers, routers, and network interface units. The multicore processor also includes a computation layer, for conducting computations using the set of processing cores, with executable instructions for the set of processing pipelines which are executed by the set of core controllers. The multicore processor also includes a network-on-chip layer, for connecting the set of processing cores in the multicore processor, with executable instructions for the set of routers and the set of network interface units. The multicore processor also includes a set of programmable controllers, with executable instructions for reformatting computational data from the computation layer for transmission through the network-on-chip layer.

18 Claims, 6 Drawing Sheets

Related U.S. Application Data

(60) Provisional application No. 62/882,065, filed on Aug. 2, 2019.

(56) References Cited

U.S. PATENT DOCUMENTS

| | | |
|---|---|---|
| 2009/0260013 A1 | 10/2009 | Heil et al. |
| 2010/0161938 A1 | 6/2010 | Heddes et al. |
| 2011/0085550 A1 | 4/2011 | Lecler et al. |
| 2015/0103822 A1 | 4/2015 | Gianchandani et al. |
| 2017/0153993 A1 | 6/2017 | Palmer et al. |
| 2017/0220499 A1 | 8/2017 | Gray |
| 2019/0258796 A1 | 8/2019 | Paczkowski et al. |
| 2020/0067816 A1 | 2/2020 | Elsherbini et al. |

OTHER PUBLICATIONS

First Office Action from Chinese Application No. 202010765332.4 dated Jan. 18, 2023, 5 pages.
First Examination Report from EP Application No. 20188876.5 dated Jan. 25, 2024, 13 pages.
Carara et al., "Differentiated Communication Services for NoC-Based MPSoCs", IEEE Transactions on Computers, IEEE, vol. 63, No. 3, Jun. 5, 2012, pp. 595-608.
Extended European Search Report dated Mar. 4, 2021 from European Application No. 20188876.5, 12 pages.
Final Office Action dated Nov. 19, 2021 from U.S. Appl. No. 16/942,492, 37 pages.
Grzegorz Chmaj et al., "Overlay-NoC and H-Phy based computing using Modern Chip MultiProcessors", 978-1-4673-0818-2/12 IEEE, 2012, 6 pages.
Meloni et al., "System Adaptivity and Fault-Tolerance in NoC-based MPSoCs: The MADNESS Project Approach", Digital System Design, 2012 15th Euromicro Conference, IEEE, Sep. 5, 2012, pp. 517-524.
Nachiket Kapre, "Marathon: Statically-Scheduled Conflict-Free Routing on FPGA Overlay NoCs", IEEE, 2016, 8 pages.
Nonfinal Office Action dated May 26, 2021 from U.S. Appl. No. 16/942,492, 50 pages.
Notice of Allowance dated May 18, 2022 from U.S. Appl. No. 16/942,492, 33 pages.
Tobias Bjerregaard et al., "A Survey of Research and Practices of Network-on-Chip", ACM Computing Surveys, ACM, vol. 38, No. 1, Jun. 29, 2006, 51 pages.
Venkata Yaswanth Raparti at al., "Memory-Aware Circuit Overlay NoCs for Latency Optimized GPGPU Architectures", 17th Int'l. Symposium on Quality Electronic Design, 978-1-5090-1213-8/16, IEEE, 2016, 6 pages.
Venkata Yaswanth Raparti at al., "DAPPER: Data Aware Approximate NoC for GPGPU Architectures", IEEE, 2018, 8 pages.

* cited by examiner

300

400

410

OVERLAY LAYER FOR NETWORK OF PROCESSOR CORES

CROSS REFERENCE TO RELATED APPLICATIONS

This application is a continuation in part of U.S. patent application Ser. No. 16/942,492, filed Jul. 29, 2020, which claims the benefit of U.S. Provisional Patent Application No. 62/882,065, filed Aug. 2, 2019, both of which are incorporated by reference herein in their entireties for all purposes.

BACKGROUND

Processing cores can cooperatively execute complex computations by executing component computations of those complex computations in a distributed fashion across the processing cores. To do so, the processing cores need to share data required for the execution of those component computations as well as receive instructions regarding which component computations they have been assigned. The technology associated with how the complex computations are broken down into component computations and assigned to the various processing cores is associated with the field of parallel computing.

Processing cores can be connected via a network in order to facilitate the exchanges of data associated with parallel computing. Each processing core can be connected to the network via a dedicated router. When the processing cores are located on a single chip, the network can be referred to as a network-on-chip (NoC). Data can be transmitted amongst the cores using unicast, multicast, or broadcast transmissions. In traditional approaches, the transmissions can be single-hop or multi-hop depending upon how the cores are connected and the physical location of the source and destination cores within the network. For example, adjacent cores may be able to communicate using a single-hop transmission while distal cores might need to communicate via multi-hop transmissions as data is passed in series between adjacent routers and forwarded from each intermediate router on to the final destination router.

FIG. 1 illustrates a portion of a NoC 100 in which four processing cores 101, 102, 103, and 104 are linked by a network. The network includes a set of buses which communicate with each processing core using a dedicated router, such as routers 110, 111, 112 and 113. The routers communicate with their associated processing core using a network interface unit (NIU). The set of buses include wires connecting the routers to each other and the routers to their NIUs. The NIU is instantiated in hardware on the processing core. The processing cores 101, 102, 103, and 104 execute the component computations they have been assigned using a memory and a processing pipeline. The inputs and outputs of the component computations are routed using the routers 110, 111, 112, and 113 under the control of the NIUs. The NIUs are low-level components and can execute data transmissions using corresponding low-level memory copy primitives in which a local segment of memory on a processing core is copied to a remote segment of memory on another processing core. In the basic case of a single-hop unicast data transmission, the memory copy operation involves copying a buffer of a limited fixed size from memory on a source core and writing it to a buffer in a memory on the destination core via the buses. In order to transmit larger amounts of data, the system needs to issue multiple memory copy operations.

FIG. 1 also illustrates a layer diagram 150 of the same NoC 100. In layer diagram 150, and all other layer diagrams in this disclosure, blocks with sharp edges indicate hardware while blocks with rounded edges indicate software instantiated by the hardware on which the block is stacked. The layer diagram shows computation layer 151 which is instantiated by instructions executed by the processing pipelines and stored in the memories of each of the processing cores, and the NoC layer 152 which is instantiated by instructions executed by the NIUs, routers, and buffers on the various cores that implement the low-level primitives associated with transmissions of data among the cores. As described in the summary below, the concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device. Indeed, those of ordinary skill in the art will recognize that NIUs are not highly configurable or programmable. The instructions to execute a low level primitive such as the memory copy operation in the single-hop unicast data transmission example mentioned above are still fairly numerous and involve identifying the remote segment of memory to which the data will be copied, assuring that the remote segment of memory has enough space for the copy operation, keeping track of and reserving a local segment of memory, providing the NIU with the data itself and the address for each piece of the data to be transmitted, and also tracking the status of the memory copy operation. In case of larger buffers, the instructions also involve breaking data up into multiple memory copy operations.

The NoC layer 152 abstracts away only the transfer of a fixed piece of data (via the low-level memory copy primitive) from the purview of the computation layer 151. As described above, computation layer 151 is still heavily involved with software instructions that initiate and track the status of the memory copy operation. In addition, computation layer 151 also participates in multicore data flow management and control at a level above the simple memory copy operations. In practice, the workload of the computation layer in this regard includes the management of the data structures into which the data will be written, keeping track of the location of those data structures, polling source cores to see if data is ready for inbound transfers, and transmitting signals to destination cores to alert them that data is ready for outbound transfers. In a specific example, a computation layer will manage a write pointer for a FIFO in memory and will need to deal with situations such as when the FIFO becomes full or in which multiple cores are requesting to write to the same destination FIFO at the same time, and then arbitrate among these write attempts.

SUMMARY

Methods and systems related to the efficient execution of complex computations by a multicore processor and the movement of data among the various processing cores in the multicore processor are disclosed herein. The processing cores can execute component computations of the complex computation using a computation layer. The complex computation can be specified by a programmer using application code which is then compiled into instructions for execution by the computation layer. The computation layer can be distributively instantiated by a set of processing pipelines and associated memories on the processing cores. The data for the complex computation can be moved among the cores to facilitate the cooperative execution of the complex computation by the processing cores. The data can be operand data used by operations that are executed during the complex computation or data that represents instructions for the operations themselves. In this disclosure, both of these types of data will be referred to as computation data. The multicore processor can be implemented on a single chip and utilize a NoC system to facilitate the transfer of data between the processing cores. The NoC system can comprise a set of buses connecting the processing cores. The physical movement of data between processing cores can be facilitated by a NoC layer which includes the physical connections between the processing cores. In specific embodiments of the invention, the processing cores can include a NoC overlay layer distributively instantiated across the processing cores which logically isolates the computation layer of the processing cores from the NoC layer that interconnects the processing cores.

The NoC overlay layer can automatically handle all the data flow management tasks which would otherwise be required when formulating application code for execution by a computation layer with a direct interface to a NoC layer. The NoC overlay layer can enhance the efficiency of the processing cores in conducting complex computations in that it serves to isolate the computation layer from communication and memory management tasks so that it can focus on conducting computations. In particular, the NoC overlay layer can isolate the computation layer from needing to manage the data structures which hold data to be transferred on a source core and data to be provided at a destination core. Depending upon the application, the benefits of the offloading of tasks from the computation layer can be realized as a decrease in the physical computational resource burden placed on the processing pipelines of the processing cores associated with communication and memory management. Alternatively, or in combination, the benefits of offloading tasks from the computation layer can be recognized by simplifying the programming or compiling of application code for conducting computations using the processing cores.

With respect to the second benefit highlighted in the previous paragraph, it is important to recognize the disconnect between the memory management requirements of traditional higher-level programming languages as compared to those required to interface directly with a NoC layer. Although memory management plays a role in certain low-level programming languages, the degree to which application code must handle the movement of data when interfacing with a NoC layer is far more complex than what programmers of source code for complex computations are accustomed to, especially programmers that are accustomed to programming in higher-level languages such as C, Java, Ruby, and Python. Accordingly, a NoC overlay layer that logically isolates these lower-level memory management tasks from the application code will open up the field of programming for NoC layers to a much wider array of programmers instead of the more limited set of programmers that specialize in low-level programming languages.

Throughout this disclosure the term "layer" is used in accordance with the standard usage of that term by those of ordinary skill in the art including usages with reference to the Open System Interconnection model (OSI) for telecommunications and networked computing systems generally. Specifically, the term "layer" refers to a system executing a set of instructions stored in memory or otherwise instantiated by hardware, including instructions instantiated in sequential logic and/or read only memory (ROM), that serve as a layer of abstraction for adjacent layers, via an interface, to thereby allow for the separation of concerns and facilitate interoperability. The layers can comprise the aforementioned instructions and an interface to at least one adjoining layer. Throughout this disclosure a combination of layers that are capable of operative communication, including the interface or interfaces between those layers, will be referred to as a "stack."

In specific embodiments of the invention, the layers can be implemented entirely in hardware, entirely in software, or by a combination of both hardware and software. In specific embodiments of the invention, the computation layer will be implemented entirely in software, the NoC layer will be implemented entirely in hardware, and the NoC overlay layer will be implemented entirely in hardware. In specific alternative embodiments of the invention, the computation layer will be implemented entirely in software, the NoC layer will be implemented entirely in hardware, and the NoC overlay layer will be implemented in software and hardware. In specific embodiments of the invention, the computation layer will be implemented entirely in software, the NoC layer will be implemented entirely in hardware, and the NoC overlay layer will be implemented entirely in software. In specific embodiments of the invention, the NoC overlay layer facilitates the transmission of data through the NoC, memory management on all the processing cores, and the synchronization and identification of arbitrarily sized data by the various processing cores involved in a transmission of data through the NoC.

In specific embodiments of the invention, a multicore processor stack is provided. The stack can be stored on non-transitory computer readable media in the multicore processor. The stack can include a computation layer, for conducting computations using a set of processing cores in the multicore processor, with executable instructions for a set of processing pipelines in the set of processing cores. The stack can also include a NoC layer, for connecting the set of processing cores in the multicore processor, with executable instructions for a set of routers and network interface units in the multicore processor. The stack can also include a network-on-chip (NoC) overlay layer that logically isolates the computation layer and the network-on-chip (NoC) layer. The network-on-chip (NoC) overlay layer can be distributively instantiated across the processing cores in the multicore processor.

In specific embodiments of the invention, a multicore processor stack is provided with the ability to reformat data in transit from one processing core to another processing core. The data reformatting can, in specific embodiments, be conducted by the NoC overlay layer mentioned above. However, in alternative embodiments, the data reformatting can be conducted by dedicated hardware that is separate from the hardware or software used to instantiate the NoC overlay layer. In specific embodiments of the invention, the computational data used by the multicore processor can be reformatted between when it is made available on a memory of a first processing core in the multicore processor and when it is delivered to a memory on a second processing core in the multicore processor. Such reformatting of data is referred to herein as reformatting in transit as opposed to reformatting for transit. In specific embodiments disclosed herein, data is obtained from a memory on a first processing core and is stored into a memory on a second processing core in a different format. This is not equivalent to temporarily packetizing or otherwise assembling computational data into different structures for the purpose of transmitting the data through the NoC. Specific benefits accrue to approaches that reformat data in transit without using any of the computation layer's resources as a reduction in data manipulation tasks required to be executed by the computation layer results in more resources being available for actual computations. Furthermore, in specific embodiments the kernel sets of the various processing cores can be simplified in that they do not need to be designed to work with multiple types of data formats or alter the size of specific data elements in order to conduct the associated computations and operations. A multicore processor with processing cores having different kernel sets would be able to conduct operations on multiple data formats while drastically reducing the number of kernels that would be required if each core needed to be able to conduct operations on all of those data formats.

In specific embodiments of the invention, a multicore processor is provided. The multicore processor can include a multicore processor stack. The stack can include a computation layer for conducting computations using a set of processing cores in the multicore processor with executable instructions for a set of processing pipelines in the set of processing cores. The stack can also include a network-on-chip layer, for connecting the set of processing cores in the multicore processor, with executable instructions for a set of routers and network interface units in the multicore processor. The stack can also include a NoC overlay layer that logically isolates the computation layer and the network-on-chip layer.

In specific embodiments of the invention, a multicore processor is provided. The multicore processor can include a multicore processor stack. The stack can include a computation layer, for conducting computations using a set of processing cores in the multicore processor, with executable instructions for a set of processing pipelines in the set of processing cores. The stack can also include a network-on-chip layer, for connecting the set of processing cores in the multicore processor, with executable instructions for a set of routers and network interface units in the multicore processor. The stack can also include a NoC overlay layer. The NoC overlay layer can be in communication with both the computation layer and the network-on-chip layer. The NoC overlay layer can administrate a network-on-chip overlay graph for administrating the exchange of data among the cores of the multicore processor. The network-on-chip overlay graph can execute asynchronously.

In specific embodiments of the invention, a multicore processor is provided. The multicore processor comprises a set of processing cores and a set of processing pipelines. Each processing core in the set of processing cores has a processing pipeline from the set of processing pipelines. The multicore processor also comprises a set of core controllers, wherein each processing core in the set of processing cores has a core controller from the set of core controllers. The multicore processor also comprises a set of routers, wherein each processing core in the set of processing cores has a router from the set of routers. The multicore processor also comprises a set of network interface units. Each processing core in the set of processing cores has a network interface unit from the set of network interface units. The multicore processor also comprises a computation layer, for conducting computations using the set of processing cores in the multicore processor, with executable instructions for the set of processing pipelines in the set of processing cores, wherein the executable instructions for the set of processing pipelines in the set of processing cores are executed by the set of core controllers. The multicore processor also comprises a network-on-chip layer, for connecting the set of processing cores in the multicore processor, with executable instructions for the set of routers and the set of network interface units. The multicore processor also comprises a set of programmable controllers, with executable instructions for reformatting computational data from the computation layer for transmission through the network-on-chip layer, wherein each processing core in the set of processing cores has a programmable controller from the set of programmable controllers.

DETAILED DESCRIPTION

Methods and systems related to the efficient execution of complex computations by a multicore processor and the movement of data among the various processing cores in the multicore processor in accordance with the summary above are disclosed in detail herein. These multicore processors can include a NoC overlay layer, in accordance with the summary above, which logically isolates a NoC layer from a computation layer. Various implementations of such a NoC overlay layer and different ways in which specific embodiments of the NoC overlay layer logically isolate the NoC layer and computation layer are described below. The methods and systems disclosed in this section are nonlimiting embodiments of the invention, are provided for explanatory purposes only, and should not be used to constrict the full scope of the invention.

Figure 1:
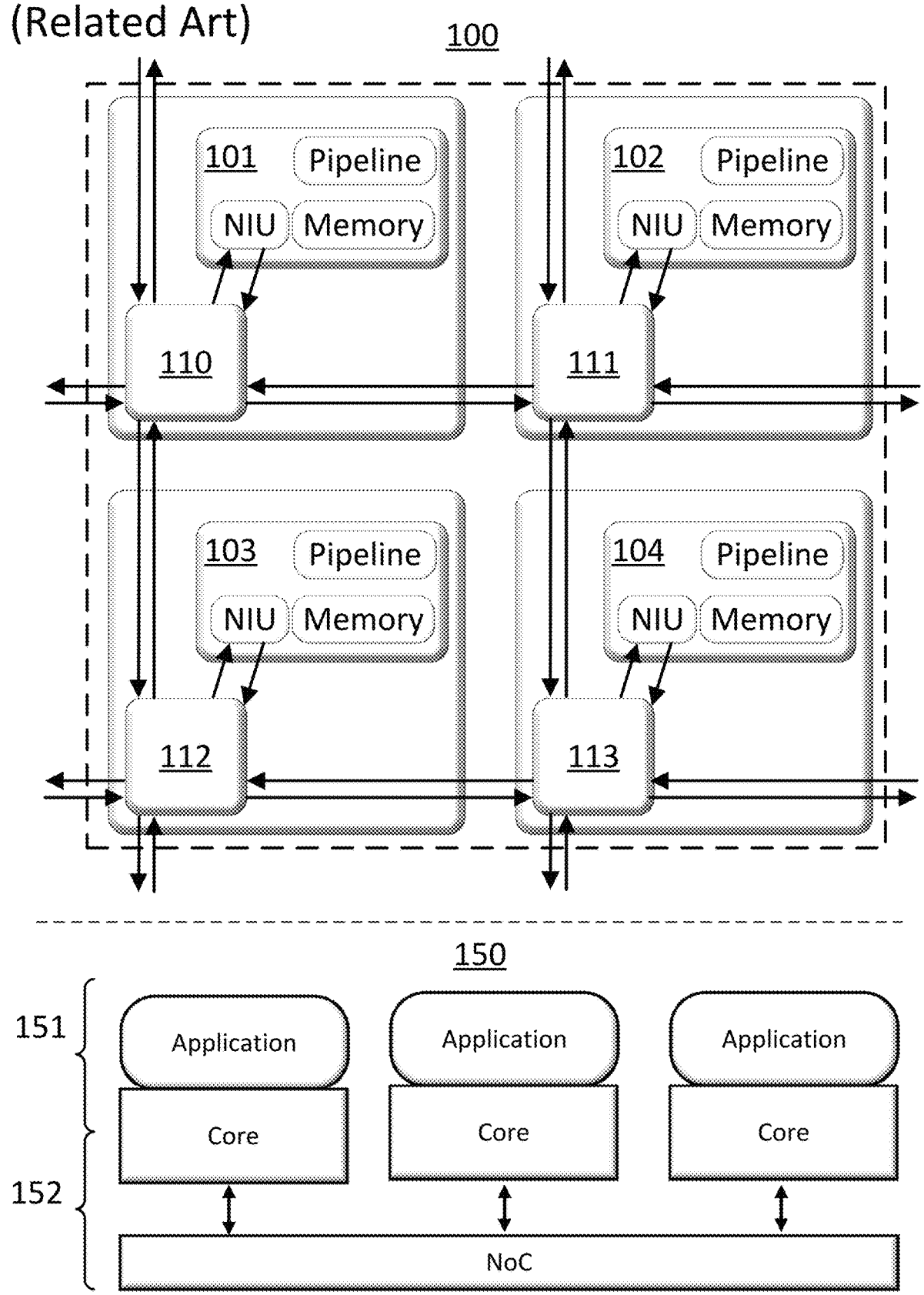
FIG. 1 includes both a block and layer diagram of a portion of a multicore processor connected by a NoC network in accordance with the related art.

Specific embodiments described below are provided with reference to the environment of a multicore processor including a set of processing cores connected by a NoC. The processing cores can include an NIU for interfacing with a router, a processing pipeline, and a memory. The NIU can exhibit the functionality and structure of NIUs found in the related art and described with reference to the NIUs in FIG. 1. In particular, the NIUs can be configured to allow any processing core in the NoC to write to the main memory of any other processing core in the NoC using a memory copy operation from the main memory of a first processing core to the main memory of a second processing core. The processing cores could also include additional or more specific elements such as a higher-level controller, serializer/de-serializer, nonvolatile memory for modifiable configuration information, a volatile memory such as an SRAM, and any number of arithmetic logic units and other fundamental computation units. The processing pipelines can be used to execute component computations required for the multicore processor to execute a complex computation. The NoC mentioned in this portion of the description can include routers on each of the processing cores and a system of buses that either solely connect adjacent processing cores in the multicore processor for facilitating multi-hop communications or also connect distal processing cores for facilitating single-hop communications between those distal processing cores. The processing cores can all be located on a single chip such as a monolithic semiconductor chip or multiple-source wafer bonded chip.

Although the specific examples provided in this disclosure are mainly directed to processing cores in a multicore processor, the approaches disclosed herein are broadly applicable to any network of computational nodes. Although the specific examples provided in this disclosure are mainly directed to a dedicated network in the form of a NoC on a single chip, the approaches disclosed herein are broadly applicable to any interconnect fabric or programmable system which transports data between nodes of the system in which each computational node of the interconnect fabric includes a low level networking unit and router that cooperate to: (i) send instructions which cause a low level networking unit on a separate computational node to write data directly to the main memory of that separate computational nodes on the network; and (ii) receive instructions from separate computational nodes and write data directly to the main memory of the computational node with the low level networking unit working as a servant of the separate computational nodes in such an operation. As used herein and in the appended claims the term "NoC", "NoC overlay layer", and "NoC layer" are all used with reference to any such interconnect fabric regardless of whether the interconnect fabric is implemented on a single chip. In this way, NoCs in accordance with specific embodiments of the invention could be implemented on a single chip system (including wafer-scale systems), in a multichip single package system, or in a multichip system in which the chips are commonly attached to a common substrate such as a printed circuit board (PCB), interposer, or silicon mesh. NoCs in accordance with specific embodiments of this disclosure can also include chips on multiple substrates linked together by a higher-level common substrate such as in the case of multiple PCBs each with a set of chips where the multiple PCBs are fixed to a common backplane. The NoCs disclosed herein could also be implemented in a chiplet based systems. For example, in specific embodiments of the invention, one or more computational nodes, along with a low level network unit such as an NIU, could be housed or implemented by one or more chiplets, connected, for example, through an interposer. In another specific embodiments of the invention, one or more computational nodes of a compute clusters could be implemented as independent computers, each computer with an instantiation of NOC overlay specialized for inter-node communication, implemented in combination of hardware and software components. The abstraction of the computation layer in accordance with specific embodiments of the invention could be implemented in any of the above systems in a similar manner as described herein for processing cores in a multicore processor connected through a NoC on a single chip.

Figure 2:
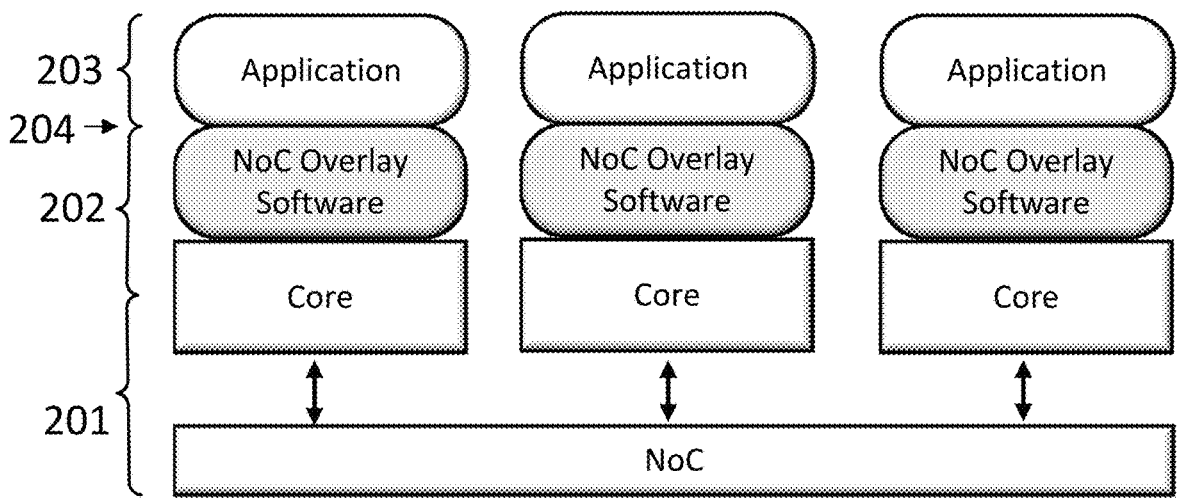
FIG. 2 includes a layer diagram of a portion of a multicore processor connected by a NoC network with a NoC overlay layer implemented in software and a second layer diagram with a similar NoC overlay layer implemented in hardware both of which are in accordance with specific embodiments of the invention disclosed herein.
Figure 2:
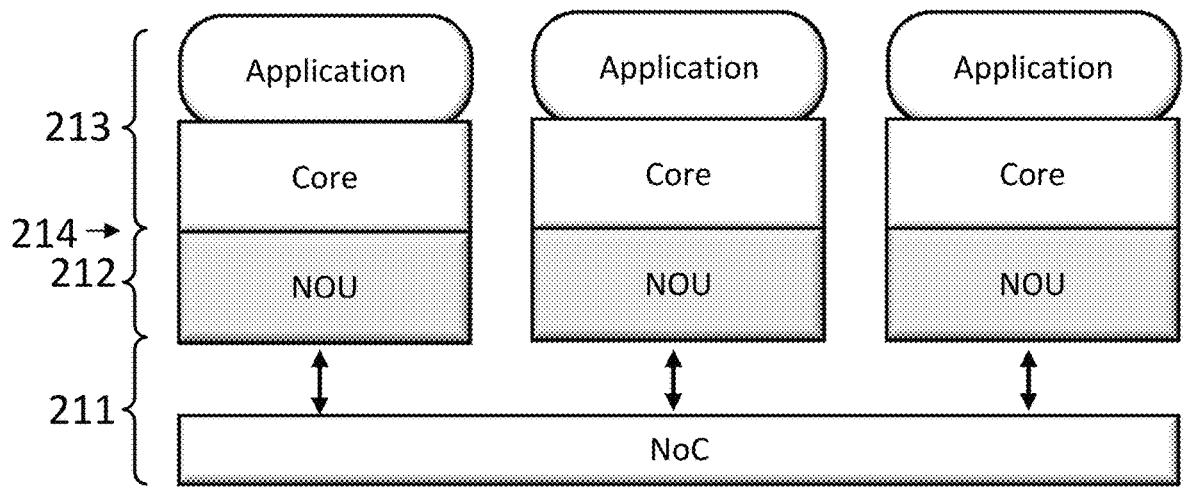

In specific embodiments of the invention, the NoC overlay layer can be entirely software-instantiated. FIG. 2 provides a layer diagram 200 which illustrates the relationship of computation layer 203, NoC overlay layer 202 and NoC layer 201. As with FIG. 1, the blocks in FIG. 2 with sharp corners indicate hardware elements and blocks with rounded corners indicate software elements. Also, software elements are stacked above the hardware used to instantiate the software elements and elements in the stack that are in contact are communicatively connected via interfaces. As illustrated, the NoC overlay layer 202 is distributively instantiated across three processing cores for purposes of illustration. The three processing cores can be part of a set of processing cores in a multicore processor. In practical application, the number of processing cores can be much larger. NoC overlay layer 202 can be software-instantiated via the storage of executable instructions in a set of memories on the set of processing cores in the multicore processor.

In the specific embodiments of the invention where the NoC overlay layer is implemented in software, the NoC overlay layer can be implemented on either an additional set of general purpose controllers which execute instructions to implement the NoC overlay layer or on a set of controllers that are specialized for the execution of overlay instructions. For example, each processing core, in addition to the components already mentioned, such as processing pipeline, NIU, and router, can also include one or more additional controllers, such as an additional generic CPU or a dedicated NoC overlay processor, that can be dedicated to implement the functions of the overlay. Those dedicated controllers could accept overlay APIs commands (such as push, send, pull, receive) from the application and implement them, and could issue commands for the NIU in response to those overlay API commands. In the case of dedicated NoC overlay processors, the overlay API commands could be part of the native instruction set of the dedicated NoC overlay processor's kernel. In specific embodiments of the invention, the one or more dedicated controllers can logically isolate the computation layer from the NoC/NIU, and can also alleviate the application CPU, processing pipeline, or computation layer generally, from implementing any of the NoC overlay layer functionalities by itself. These dedicated controllers could be general purpose controllers, such as a general purpose CPU, or specialized for NoC overlay layer implementation, with custom instructions, pipeline, caches, etc. These dedicated controllers could be implemented in hardware in the form of network overlay units (NOUs) such as those described elsewhere in this disclosure.

In specific embodiments of the invention, the computation layer and the NoC overlay layer are communicatively connected via an interface (204, 214). The interface could be configured to allow for the flow of data in either direction across the interface. The interface can be an application programming interface. The application programming interface can receive API calls from the computation layer and provide API call responses from the NoC overlay layer. In specific embodiments of the invention, the API aides in the logical isolation of the computation layer from the NoC layer in that the complexities of data movement and memory management associated with a multicore processor are abstracted away from the computation layer via the API calls.

The API calls on the interface between the computation layer and the NoC overlay layer can take on various forms. The API calls can be utilized in application code used to specify a complex computation for execution by the multicore processor. The API calls could be simple commands such as send, receive, push, pull, etc. where the operands of the calls were variables in the syntax of the application code with an identification of the processing core that the variable should be obtained from or sent to (e.g., push(variable X, core 23)). In this example, the operands indicate which core the command was meant to interact with (i.e., core number 23). However, in alternative specific embodiments, the NoC overlay layer would abstract out the identities of the individual cores from the purview of the computation layer as instantiated on each chip (e.g., push(variable X) on one core, and pull(variable X) on another core). In these embodiments, the NoC overlay layer would keep track of the fact that a request for sending variable X from whichever core was executing the API call would involve utilizing core number 23 as the destination for variable X.

In specific embodiments of the invention, the NoC overlay layer is entirely hardware-instantiated. FIG. 2 also provides a layer diagram 210 which shows computation layer 213, NoC overlay layer 212, and NoC layer 211. In specific embodiments in accordance with layer diagram 210, the NoC overlay layer 212 is entirely hardware-instantiated via a set of dedicated hardware components, such as NOUs in the multicore processor. The NOUs can include registers and sequential logic and can route data to and from the memory or processing pipeline of the processing core to the NIU of the processing core. The NOUs can include internal hardware subcomponents for implementing transitions of data. The hardware subcomponents could implement state machines in order to execute an application data flow graph. The NOUs can include dedicated hardware modules for translating data from the NIU into events for the NOU and to translate events from the NOU into commands for the NIU. In this way, the NOUs can translate the data flow information from the NoC layer to the NoC overlay layer, and from the NoC overlay layer to the NoC layer. The NOUs can also be in operative connection with the CPU or controllers in the processing cores and receive control signals, such as configuration instructions, from the computation layer. The NOUs can be implemented by augmenting the NIUs of an existing multi-processor design or by adding an entirely new block to implement the NOUs and communicate with the existing NIUs in an existing multicore processor design. In specific embodiments of the invention, a set of NOUs on the set of processing cores in the multicore processor can physically isolate the set of NIUs and the set of routers from a set of memories and a set of processing pipelines on the processing cores. In these embodiments, the set of memories and the set of processing pipelines could instantiate the computation layer. As such, the NoC overlay layer, as implemented with the NOUs, will both logically and physically isolate the computation layer from the NoC layer in these embodiments.

In specific embodiments of the invention in which the NoC overlay layer is entirely hardware instantiated, the computation layer and the NoC overlay layer are communicatively connected via a hardware interface. For example, the API mentioned above could be implemented in hardware on the NoC overlay layer side of the interface. The interface could include a register file on the NoC overlay side of the interface, and the processing core could be configured to write to or read from the register file in order to execute an API call. Alternatively, the processing core could be configured to write or read from a local buffer identified by an address in the register file to execute the API call. Specific registers in the register file could be polled periodically to check to see if a command was in-bound from the NoC overlay layer side of the interface. The register file could include a first set of registers and a second set of registers. The computation layer could be configured to write to the first set of registers and read from the second set of registers. The NoC overlay layer could be configured to read from the first set of registers and write to the second set of registers. In this manner data could be passed in either direction across the interface to facilitate a communicative connection between the layers. Additional registers could be provided on either side of the interface regarding the content of those first two sets of registers including an address of which register should be read or written to or an indicator that a specific predetermined register address was ready to be read from or written to.

In specific embodiments of the invention, the NoC overlay layer and the NoC layer are communicatively connected via an interface. The interface could be configured to allow for the flow of data in either direction across the interface. The NoC layer could provide inbound information from alternative processing cores and accept commands regarding output information destined for alternative processing cores. The NoC overlay layer could provide inbound information from the computation layer destined for alternative processing cores and accept outbound information destined for the computation layer. The NoC overlay layer can thus serve to provide a communicative connection between the NoC layer and computation layer while still logically isolating the two layers. In specific embodiments of the invention, the interface can include a register file of the NoC layer that is configured to receive instructions to implement the transfer of data to specific cores in the multicore processor. The register file could include a register to receive the data to be written to the alternative core and a register to receive an identifier for the specific core or cores. Alternatively, in place of the register to receive the data to be written to the alternative core, the register file could include an address and size of a buffer, holding the data to be written to the alternative core, in a processing core's local memory. As mentioned above, the NoC overlay layer could be implemented entirely in software, in which case the instantiated software would control the processing core to write data to the aforementioned registers or the buffer in the processing core's local memory identified by the register file. In these embodiments, the processing core could be configured such that the NoC overlay layer, as instantiated entirely in software, viewed the interface with the NoC layer as an API. In specific embodiments of the invention, the commands for the API could closely replicate the interface between a traditional computation layer and a traditional NoC layer as described with reference to FIG. 1.

The NoC overlay layer can logically isolate the NoC layer from the computation layer in various ways. In specific embodiments of the invention, the NoC overlay layer will logically isolate the computation layer by presenting an interface with an API to the computation layer such as the one described above. In specific embodiments of the invention, the NoC overlay layer can logically isolate the computation layer by asynchronously executing the API calls from the computation layer. In specific embodiments of the invention, the NoC overlay layer will logically isolate the computation layer by abstracting all data movement and memory management tasks associated with a traditional NoC layer away into an interface that either provides data for the computation layer on a given core or accepts outbound data from the computation layer on a given core. In specific embodiments of the invention, the NoC overlay layer will logically isolate the computation layer by abstracting the location of data required for conducting component computations away from the computation layer. In specific embodiments of the invention, the NoC overlay layer will logically isolate the computation layer by providing a sole interface to the computation layer for engaging in the complex computation of the multicore processor with the alternative processing cores that does not require any data that could be used to identify any of those alternative processing cores. Each of the specific approaches described in this paragraph are described below and can be used in the alternative or in combination.

In specific embodiments of the invention, the NoC overlay layer can logically isolate the computation layer by asynchronously executing the API calls from the computation layer. The NoC overlay layer can implement the transfer of data between processing cores by compiling and executing primitive memory management routines via its interface with the NoC layer without additional reliance on the computation layer after an API call has been received. For example, the computation layer can make an API call to the NoC overlay layer and then enter a holding pattern when waiting for data from alternative processing cores allowing the NoC overlay layer time to handle the associated memory management and data movement operations. In specific embodiments of the invention, the NoC overlay layer can conduct these operations and manage the NoC layer while the computation layer continues to execute component computations. For example, the computation layer can make an API call to the NoC overlay layer and then periodically poll the NoC overlay layer for the data while continuing to execute computations. As another example, the computation layer can make an API call to the NoC overlay layer and then instantiate an event listener to await a response from the NoC overlay layer while continuing to execute computations. In specific embodiments of the invention, each API call from the computation layer can be matched with an API call response from the NoC overlay layer that is provided either to confirm receipt of the call and/or to confirm execution of the API call to facilitate this asynchronous interaction.

In specific embodiments of the invention, the NoC overlay layer can logically isolate the computation layer by presenting an interface with an API to the computation layer. The API layer can be in accordance with those described above. In particular, the API can include a push computation data API call and a pull computation data API call by which the computation layer can push computation data onto the NoC overlay layer or pull computation data from the NoC overlay layer. The push and pull computation data API calls can be matched with push and pull computation data API call responses from the NoC overlay layer. The push computation data calls can identify specific cores to which data should be sent. The pull computation data API calls can identify specific cores from which data should be pulled. However, in alternative embodiments the API calls do not need to identify specific cores and will only need to identify computation data based on an identifier for the computation data which is globally applicable across the multicore processor. In specific embodiments of the invention, the API will be the only communicative connection between the computation layer on a given processing core and an alternative processing core during the execution of a complex computation by the multicore processor. In specific embodiments of the invention, the API calls can have different behavior, such as to send and receive a variable. In specific embodiments of the invention, the API calls can include different functions and/or commands so as to allow for communication between the layers. The examples of commands such as push, pull, send and receive given throughout this disclosure should not be considered a limitation of the present invention. Other commands to be exchanged between the layers, such as "get data", "write data", "read data", "end get data", "clear data", "query for data", "data ready", etc. could be implemented through API calls.

In specific embodiments of the invention, the NoC overlay layer can logically isolate the computation layer by abstracting the location of data required for conducting component computations away from the computation layer. As used herein, reference to abstracting the location of data for the computation layer is meant to indicate that the computation layer, as instantiated on a specific processing core, only needs to be aware that computation data is either available locally on the processing core, or is not available, and so must be sought externally via a request sent to the NoC overlay layer. In specific embodiments of the invention, the executable instructions for the set of processing pipelines that are used to conduct the computations on a given processing pipeline do not include data that can be used to identify any processing core in the set of processing cores. As such, the application code which is compiled for execution on various processing cores does not even need to specify which processing core is executing which component computations. Instead, the application code can refer to variables in the complex computation and the compiler will handle assigning the associated operations to specific cores. Alternatively, a runtime system executing as part of the NOU and/or the processing pipeline can handle assigning the associated operations to specific cores during the application execution. In specific embodiments of the invention, a sole interface between the computation layer and the NoC overlay layer on a given processing core does not require data that can be used to identify any processing core in the set of processing cores while conducting component computations. In these embodiments, the sole interface could be a sole interface that provides a communicative connection between the computation layer on a given processing core and alternative processing cores via the NoC layer. In these embodiments, the multicore processor could be configured to enter into alternative modes in which additional interfaces are available for allowing the computation layer, or a high-level controller of the processing core, to communicate with the NoC layer. However, during the execution of a complex computation these alternative interfaces could be locked out leaving the sole interface mentioned above as the only method of communication between the computation layer and the NoC layer.

In specific embodiments of the invention, the NoC overlay layer distributively instantiates a NoC overlay graph across the set of processing cores. The NoC overlay graph is utilized to administrate the movement of data through the NoC layer to and from the various processing cores. The NoC overlay graph can, in combination or in the alternative, logically isolate the NoC layer from the computation layer by abstracting the specific location of data from the computation layer. The NoC overlay graph can comprise a set of nodes and a set of edges connecting those nodes. A set of edges that are utilized while moving from an entry point to an exit point along the NoC overlay graph and through the NoC overlay layer can be referred to as a path of the NoC overlay graph. A path of the NoC overlay graph, including at least one edge and extending through the graph, can begin with a push message from the computation layer and can terminate with a pull message from the computation layer. In addition, the NoC overlay layer can execute a sequence of NoC overlay graphs. A set of instructions is also provided to the NoC overlay layer that specifies the events which trigger the reconfiguration of state of the NoC overlay graph to the next NoC overlay graph in the provided sequence.

The initial state of the NoC overlay graph can be fixed during the execution of a complex computation by the multicore processor and remain fixed until an alternative set of instructions have been compiled and loaded into the processing cores. Alternatively, the NoC overlay graph can be configurable via application code during the execution of a complex computation by the multicore processor, which can occur during application runtime. For example, the processing pipeline may be configured to write to the register files of a set of NOUs or other locations, such as any addresses in memory that implement the NoC overlay graph, to thereby modify the graph. In specific embodiments, a set of NoC overlay graph states, including the initial state and a set of subsequent states, and the schedule for changing the states via instructions executed by the NoC overlay layer, can be compiled for the NoC overlay layer. A change of NoC overlay graph state can be partial, changing only a portion of the graph, while the rest of the graph continues to transfer data.

The NoC overlay graph can have an initial state, a set of subsequent states, and a schedule for changing the NoC overlay graph states determined by a compiler upon compiling the application code for a complex computation to be executed by the multi-processor core. The compiled instructions can then be injected into the various processing cores and serve as part of the instructions that instantiate the NoC overlay layer. In this way, the NoC overlay graph can be configured via a compiler offline while the NoC is not engaging in the execution of a complex computation (e.g., at application runtime) or while the NoC is engaging in the execution of a complex computation (e.g., at application runtime by injecting compiled instructions into cores in synchronization with their execution of previous instructions, by overwriting previous instructions, or while specific processing cores of the NoC are not executing instructions). If the NoC overlay layer is instantiated in hardware, this injection process can involve writing data to register files, such as in the NOUs mentioned above, on the various processing cores. The injection can involve writing instructions to a local memory of a processing core which is accessed by the NoC overlay hardware during the execution of a complex computation in order to set the state of the NoC overlay graph. If the NoC overlay layer is instantiated in software, this injection process can involve writing data into a set of memories on the various processing cores for execution by the processing pipelines of the processing cores. The set of NoC overlay graph states and the schedule for the state changes can be explicitly selected by a programmer while creating the application code for the complex computation, selected entirely as an artifact of the compilation process by the compiler attempting to maximize efficiency, or a combination of these two. The initial state, set of subsequent states, and a schedule for changing the NoC overlay graph can also be set by a higher-level controller above the computation layer, or by a controller of the computation layer. For example, the controller could be a CPU on a processing core that administrates the operation of the computation pipeline on the processing core. As another example, the controller could be an external controller from the processing core that sets the states and schedules of the NoC overlay graph entirely independent of any hardware used during the execution of a complex computation by the computation layer. Regardless, once the states and schedule are set the NoC overlay layer can still logically isolate the computation layer from low level memory management because the schedule can be executed asynchronously from the operation of the computation layer dependent only on requests for data such as pull computation data commands or the delivery of data such as push computation data commands.

In specific embodiments of the invention, the initial state of the NoC overlay graph can be changed throughout the course of executing a complex computation. The NoC overlay graph can be configurable via an API. The API can be an interface with the computation layer or with a high-level controller for the multicore processor. The high-level controller can be independent of the processing pipelines on the cores of the multicore processor, and can execute a runtime system that could configure the overlay graph during application execution. In embodiments in which the computation layer and NoC overlay layer are connected via an API for routing computation data, the same API can be used to configure the NoC overlay graph. The computation layer can have access to this API for purposes of modifying the NoC overlay layer. The API can receive commands to modify the physical location at which various portions of the NoC overlay graph are instantiated. The API can also receive commands to modify the edges and nodes of the NoC overlay graph to create new nodes, destroy existing nodes, and to draw new edges between existing nodes. The API can also receive commands to change the location identifier (e.g., core identifier) of the application variables.

In specific embodiments of the invention, the nodes in the NoC overlay graph can be implemented by streams in a set of streams. The edges in the set of edges in the NoC overlay graph can be implemented by the flow of computation data through the NoC overlay graph and between streams. The edges can represent the flow of computation data through the aforementioned streams. The streams can provide directivity to the flow of computation data but otherwise do not modify or process the data beyond assuring that data received at the input of the stream is passed on to the output of the streams. As such, the streams can be implemented using FIFO buffers of varying size. The NoC overlay layer at a processing core can be configured to allow the size of the FIFO to increase if a particular stream becomes overloaded and can include failover protection mechanisms to interrupt the complex computation and save its state if a FIFO expands beyond a limit afforded by that expansion. However, the streams can also execute more complex data routing routines. The streams can facilitate the transfer of data from one stream to another, from one stream to multiple streams, and from multiple streams to one stream. In the final case, a stream that receives data from multiple streams may have the ability to arbitrate between the incoming streams to determine which data should be passed along first. Additionally, a single stream may be configured to both receive data from multiple streams and transmit data to multiple streams. In these embodiments, regular streams could be implemented using FIFO buffers while streams with the ability to arbitrate are implemented using more complex memory and logic circuits that are able to modify the order in which data is received and passed along. The streams can be virtual constructs administrated by the NoC overlay layer to implement the NoC overlay graph. The creation of a stream would therefore involve assigning specific hardware, such as the FIFO buffers mentioned above, to implement a specific routing of data in the NoC layer.

Each stream can be configured to change state independently of other streams, which corresponds to a partial change of the NoC overlay graph state. The streams that are not being reconfigured can continue to transfer data. In addition, the inbound and outbound connections of a stream can be reconfigured independently.

In specific embodiments of the invention, the interface of the NoC overlay layer and the computation layer can also be implemented by streams. Accordingly, the set of streams that comprise the NoC overlay graph can include a set of input streams and a set of output streams. The set of input streams can be accessed by inbound messages from the computation layer regarding data to be sent to alternative processing cores. These inbound messages can be push computational data commands from the computation layer. The set of output streams can be accessed by inbound messages from the computation layer regarding data to be received from alternative processing cores. The inbound messages can be pull computational data commands from the computation layer. In specific embodiments in which the interface of the computation layer and NoC overlay layer is an API, the push computational data commands can be push computational data API calls, and the pull computational data commands can be pull computational data API calls. In specific embodiments of the invention, the push computational data command can be a write to a push computational data register file and the pull computational data command can be a write to a pull computational data register file. The actual data to be transferred can be written to the computational data register file, or an address of the data in the local memory of a core can be written to the computational data register file. Each stream can be configured to interpret the content of the computational data register file as either actual data or an address to the data.

Figure 3:
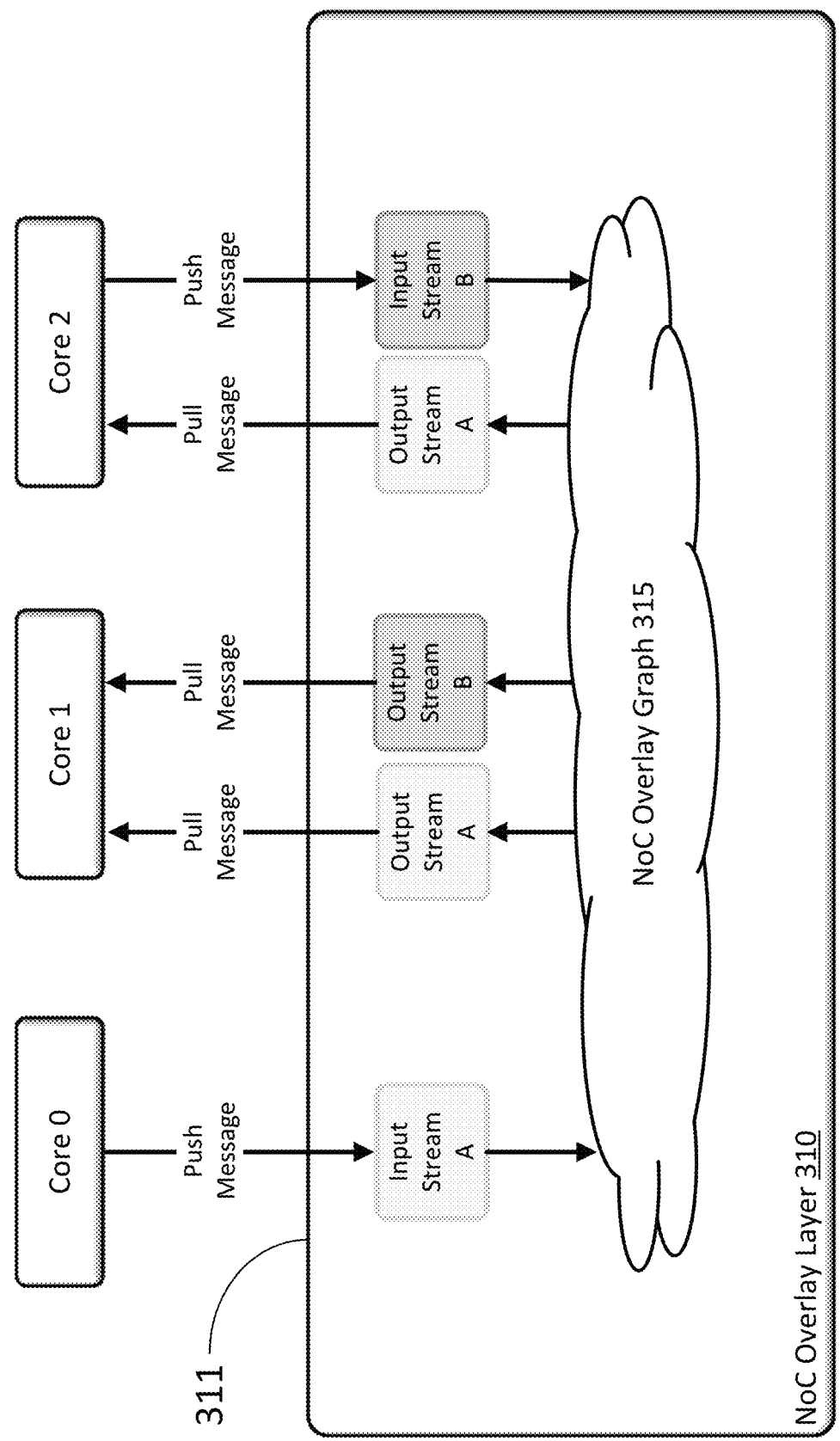
FIG. 3 includes a block diagram of a NoC overlay layer interfacing with a computation layer in accordance with specific embodiments of the invention disclosed herein.

FIG. 3 includes a block diagram 300 of three cores from a set of processing cores and their interaction with NoC overlay layer 310. As illustrated, the NoC overlay layer 310 includes a NoC overlay graph 315. The NoC overlay graph 315 receives data along input streams and outputs data along output streams. NoC overlay graph 315 will be physically instantiated in combination with the NoC layer, but is administrated by NoC overlay layer 310. In specific embodiments of the invention, data will flow through the graph along edges that connect intermediate streams within the graph itself. As illustrated, an "input stream A" can pass data "A" into NoC overlay graph 315, and that data can thereby be transported from Core 0 to both Core 1 and Core 2 via output streams. The multiple paths through the NoC overlay layer 310 could be executed simultaneously. Multiple paths of data can flow through the NoC overlay graph 315 in concert. As illustrated, "input stream B" is passing data "B" into NoC overlay graph 315, and that data is thereby transported from Core 2 over to Core 1. This path can be implemented at the same time as the path which routes data "A."

The interface 311 between the cores and the NoC overlay layer 310 in the diagram can be used to describe an interface between a computation layer and a NoC overlay layer generally. As illustrated, the NoC overlay layer 310 can receive push and pull messages from the computation layer. The pull messages could be requests for data and the push messages could be requests to send data to other locations. The arrowheads in the figure are used to illustrate the flow of data and not the flow of said messages. In the illustrated case, both the pull and push messages would be inbound messages from the computation layer to the NoC overlay layer 310. The pull messages could identify the specific data requested using an identifier or just indicate that the computation layer was ready to pull data from a specific stream which, by implication, thereby identified the data. The messages can be events indicating the availability of data, a request for data, the availability of storage space, or a request for storage space. The identification of the data could be implied owing to the fact that the stream was configured to only provide data of a certain identity, or that the stream was configured to provide a sequence of data for which the computation layer included a corresponding sequence of data identities. The sequence could be specified by the NoC overlay layer and provided ex ante to the computation layer to facilitate this method of data identification. Responses to the pull messages could include an indication that the data is not yet ready or could include the data itself. Responses to the push messages could include a confirmation that the data had been received by the NoC overlay layer or an indication that the NoC overlay layer is overloaded.

In FIG. 3, input stream A is initiated by a push message from Core 0. The push message could include the actual data "A" embedded with the message. Continuing with this example, output stream A to Core 1 is initiated by a pull message from Core 1. The pull message could be issued periodically or whenever Core 1 needs data "A." When both the push and pull messages have been received for this branch, the NoC overlay layer 310 can provide data "A" from Core 0 to Core 1. However, either message can be received prior to the other. This aspect of the interface with NoC overlay layer 310 is another reason why the NoC overlay layer can logically isolate the computation layer from the NoC layer by asynchronously executing API calls as compared to the operation of the computation layer. In specific embodiments of the invention, either end of a path can be initiated in any order but it is not until all the streams in the path have been initiated that data actually moves through NoC overlay graph 315. In specific embodiments of the invention, either side of a given node can be initiated in any order but it is not until both sides are available that data actually moves through NoC overlay graph 315. In specific embodiments of the invention, when a side of a node that is upstream in the direction of data flow is initiated, but the downstream side has not been initiated, the data can be stored on a buffer associated with the stream temporarily until the downstream side is initiated. The transfers can be administrated using streams as illustrated further by FIG. 4 below.

Figure 4:
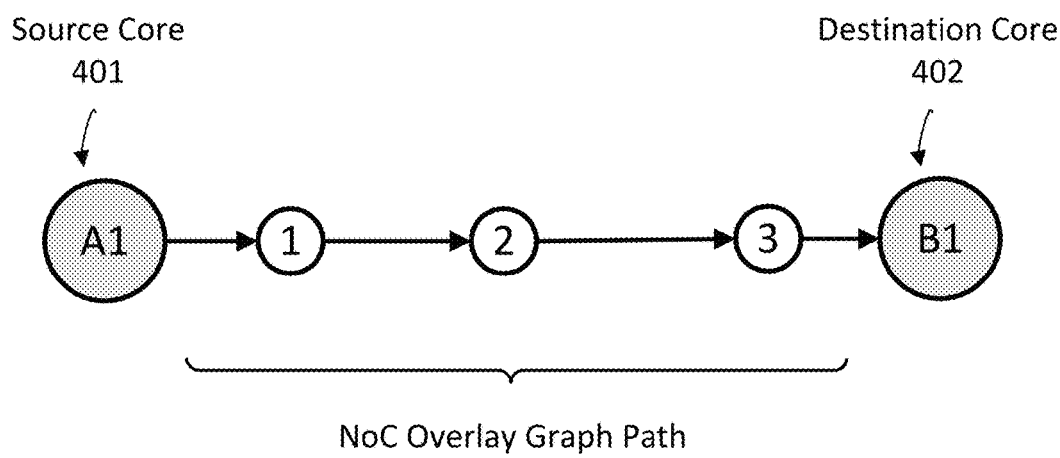
FIG. 4 includes a block diagram of a path of a NoC overlay graph and a detailed sequential data flow diagram highlighting the interaction of two nodes in a NoC overlay graph in accordance with specific embodiments of the invention disclosed herein.
Figure 4:
Figure 4:
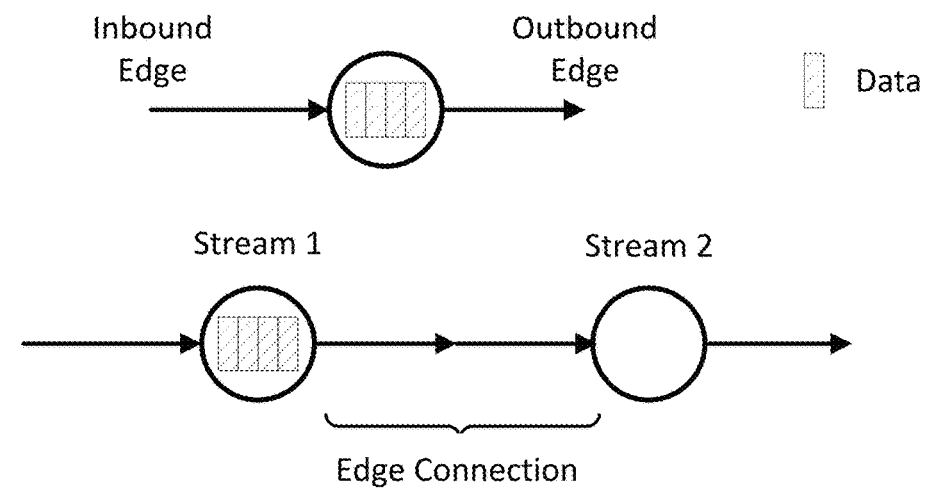
Figure 4:
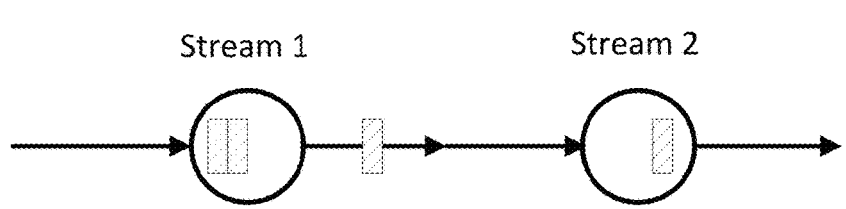

FIG. 4 includes a block diagram 400 of a path in a NoC overlay graph. The path begins with a source core 401 (A1) and terminates at a destination core 402 (B1). The cores are linked by a NoC overlay graph path comprising three streams. In specific embodiments of the invention, the first stream will be physically instantiated on core A1, the last stream will be physically instantiated on core B1 and the intermediate stream will be physically instantiated at a location selected by the NoC overlay graph as appropriate. In specific embodiments, as soon as an inbound edge of any of the streams in block diagram 400 is connected to an outbound edge of another stream or receives a push data message from core A1, and an outbound edge of the final stream receives a pull data message from core B1, data can flow through the NoC overlay graph. Furthermore, as any of the constituent connections of the path are made, data can begin to continuously flow through that constituent connection. This aspect of the NoC overlay graph allows for the asynchronous execution of data transfers through the NoC layer in isolation from the workings of the computation layer. In this way, the NoC overlay graph executes asynchronously and the NoC overlay layer is in communication with both the computation layer and the NoC layer and administrates the NoC overlay graph for administrating the exchange of data among the cores of the multicore processor.

FIG. 4 also includes a sequential data flow diagram 410 to illustrate how data can flow through the NoC overlay graph. In a first portion of the sequence, a source stream referred to as stream 1 includes an inbound edge and a disconnected outbound edge. The source stream also includes a set of four data messages stored in a buffer indicating that a connection has already been formed with the inbound edge of the stream and data is being transferred to the stream. However, since the outbound edge of the stream is disconnected, the data has nowhere to flow, and the buffer on the stream begins to fill up. In a second portion of the sequence, representing the state of the system at a time subsequent to the first portion, an inbound edge of a destination stream, referred to as stream 2, is connected to the outbound edge of stream 1. This connection can be formed by the NoC overlay layer based on the availability of resources for routing through the NoC layer, or partially changing the state of the NoC overlay graph, or based on a shifting configuration of the NoC for purposes of implementing a phase of a complex computation. In specific embodiments of the invention, stream 1 will be fully initiated, to create this state, by receiving a message or event indicating that the downstream stream, stream 2, is available to receive data. In a third portion of the sequence, representing the state of the system at a time immediately subsequent to the second portion, messages begin to flow from stream 1 to stream 2. If the outbound edge of stream 2 has previously been connected, the data will also flow through stream 2. Alternatively, if the outbound edge of stream 2 has not previously been connected, the data will begin to build up on the buffer of stream 2. The simplified example in FIG. 4 provides an illustration of how the NoC overlay layer can implement a path of the NoC overlay graph asynchronously to a pull computation data API call and/or a push computation data API call from the computation layer. As data begins to flow as soon as any intermediate stream is connected, the pull or push commands can likewise be provided in any order and at any time relative to the formation of the path.

Figure 5:
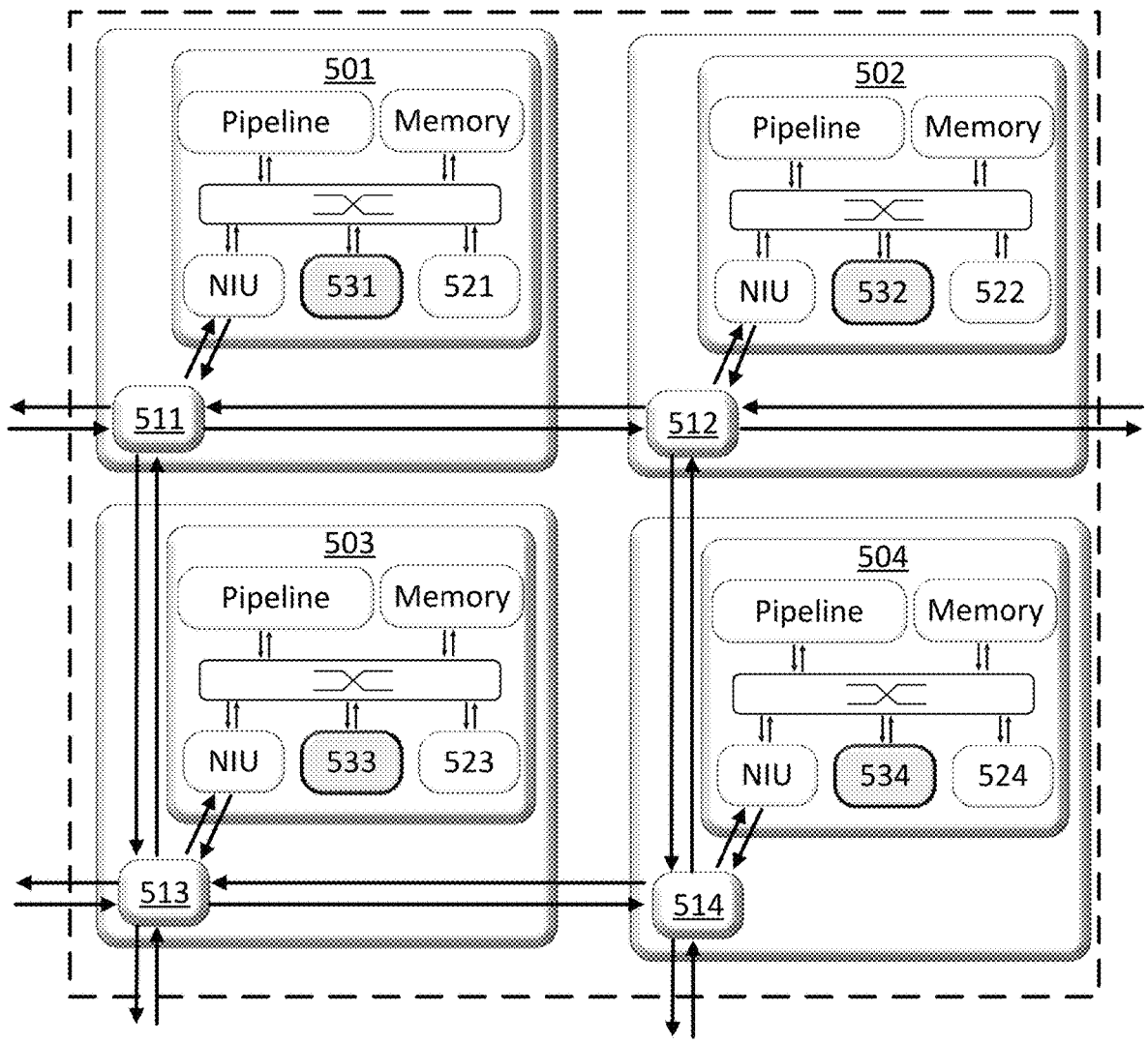
FIG. 5 includes both a block and layer diagram of a portion of a multicore processor connected by a NoC network in accordance with specific embodiments of the invention disclosed herein.
Figure 5:
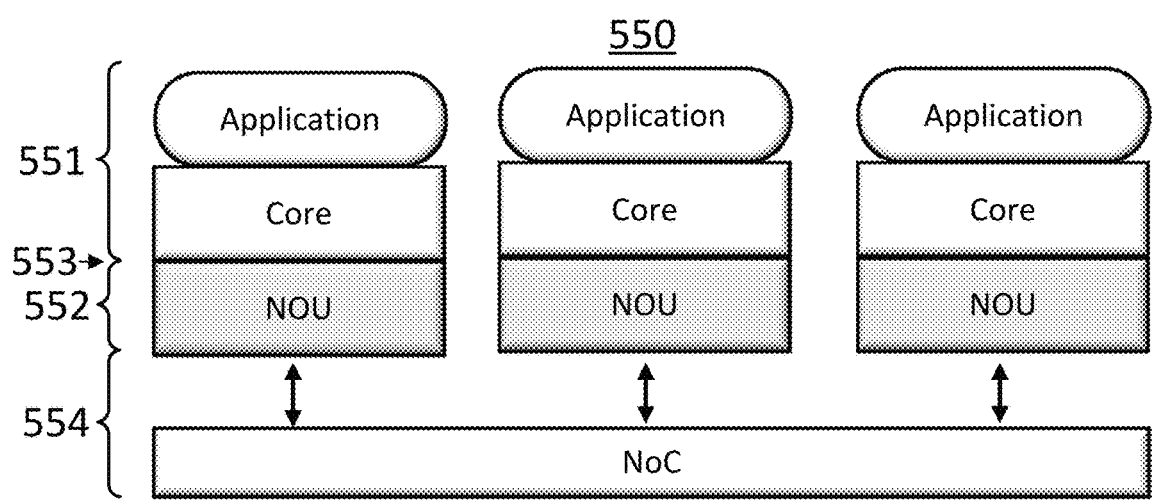

A multicore processor in accordance with specific embodiments of the present invention can include various components for executing an application data flow graph on a set of computational nodes, such as processing cores 501, 502, 503 and 504 of FIG. 5. As illustrated, the multicore processor can include a set of processing pipelines wherein each processing core in the set of processing cores has a processing pipeline from the set of processing pipelines. As illustrated, the multicore processor can include a set of routers such as routers 511, 512, 513, and 514 of FIG. 5, wherein each processing core in the set of processing cores has a core controller from the set of core controllers. As illustrated, the multicore processor can include a set of core controllers such as core controllers 521, 522, 523, and 524 of FIG. 5, wherein each processing core in the set of processing cores has a core controller from the set of core controllers. As illustrated, the multicore processor can include a set of NIUs, wherein each processing core in the set of processing cores has an NIU from the set of NIUs. A multicore processor in accordance with specific embodiments disclosed herein can include a set of dedicated hardware components for implementing a NoC overlay layer and administrating the execution of an application data flow graph, that can include a set of hardware subcomponents such as a set of programmable controllers. As illustrated, the multicore processor can include a set of dedicated hardware components such as dedicated hardware components 531, 532, 533, and 534 of FIG. 5, wherein each processing core in the set of processing cores has a dedicated hardware component from the set of dedicated hardware components. In specific embodiments of the invention, the dedicated hardware components can be or can include programmable controllers. In specific embodiments of the invention, the dedicated hardware components can be firmware controllers. The system can also include a set of memories, and each computational node can include at least one memory from the set of memories. The system can allow for data to be transitioned between the memories in the set of memories on the computational nodes in accordance with the application data flow graph and in response to the execution of instructions by the programmable controllers. The instructions can be executed in response to the exchange of the tokens and events described below.

The dedicated hardware components can be components that allow for the independent execution of an application data flow graph with no need to involve the computation layer of the system. In specific embodiments, the computation layer does not need to administrate any data movement tasks besides making data available to the NoC overlay layer in the memories of the processing cores and retrieving required data from the memories of the processing cores after it has been provided thereto by the NoC overlay layer. The dedicated hardware components can be in the form of programmable controllers or NOUs distributed across the set of processing cores. The dedicated hardware components, such as the NOUs, can include hardware subcomponents. The hardware subcomponents can be configured by instructions. Other components of the system, such as CPUs or higher-level controllers on the computation nodes, such as core controllers, can be involved in the configuration of the programmable controllers by providing instructions to the programmable controllers. The instructions could be provided to firmware of the programmable controllers. For example, the CPUs or other controllers could load instructions into memory which describe the desired behavior of the controller in order to execute a portion of the application data flow graph, and the dedicated hardware components could be designed to sequentially read and execute those instructions from the memory at a dedicated address. The memory could be the main memory of the processing core or a dedicated memory for a firmware controller. The programmable controllers could be reconfigured numerous times during the execution of an application data flow graph to implement additional transfers of data by having the higher-level controller provide an additional set of instructions to the programmable controller. The execution of those instructions can cause a programmable controller to inform alternative controllers of its status, administrate the streaming transfer of data through the network layer, or administrate memory copy operations from one location in memory in the network layer to another. The hardware subcomponents, NOUs, and programmable controllers can exhibit the features of the corresponding elements in U.S. patent application Ser. No. 17/035,046, filed Sep. 28, 2020, which is incorporated by reference herein in its entirety for all purposes.

The CPUs or higher-level controllers described in the prior paragraph can be part of the computation layer of the system. In this way, the computation layer can configure the programmable controllers, and then leave them to execute without further guidance from the computation layer thereby leaving the computation layer free from memory administration and low-level network management tasks. In specific embodiments of the invention, the CPUs or other higher-level controllers can be considered servants of the programmable controllers once the programmable controllers have been configured. For example, the programmable controllers could be configured to control a program counter or a stalled status of the CPU which would allow for more independence between the execution of the application data flow graph as the computation layer can essentially be paused if data is not yet available from the network.

The programmable controllers described above can independently and asynchronously execute the instructions which configured the programmable controllers. The programmable controllers can be configured to execute the instructions in response to events exchange between the components of the system. For example, the events could be indicators of the status of an alternative controller as having data available for downstream transmission or as being configured to facilitate the streaming transfer of data. The events can include messages passed through the interfaces of the various layers disclosed herein such as the API calls discussed above between the computation layer and the NoC overlay layer, or between the NoC overlay layer and the NoC layer. The events can include the pull messages, push messages, pull computation data API calls, and push computation data API calls described elsewhere herein. The events can also include control signals generated upon the delivery of data to a memory from the NoC hardware or upon the delivery of data to the memory from the pipelines of the processing cores. The events can be generated by the core controllers of the processing pipelines or by the dedicated hardware for the NoC overlay layer such as the NOUs. For example, an instruction executed by an NOU could involve the generation of an event upon detecting the delivery of data to the NoC hardware of the processing core. These events can also be referred to as tokens. The tokens can include an identifier of the sender of the token to provide redundancy and/or additional flexibility to the overall set of instructions used to execute a given application data flow graph. Once configured, the programmable controllers can generate events in response to events received from other elements of the system independently and asynchronously and move through their set of instructions without reference to a global clock or higher-level controller. For example, the instructions could be executed in response to events exchanged between the programmable controllers themselves, either within a single computational node or among a plurality of computational nodes, such as the processing cores in a NoC. The programmable controllers could also be executed in response to events exchanged between the programmable controllers and the NIUs of the computational nodes. The programmable controllers could also be executed in response to events exchanged between the programmable controllers and the controllers or pipelines of the processing cores.

Layer diagram 550 is provided to explain the separation of duties between different layers and the implementation of the layers to different hardware and software in accordance with specific embodiments of the invention disclosed herein. Layer diagram 550 includes a computation layer 551 which is implemented by the core controllers and pipelines of the cores. This layer conducts the computations of the system in accordance with instructions stored in the memory and computation data that is pulled from the memory in response to which computation data is then written back to the memory. The layer diagram 550 also includes a network overlay layer 552 which is implemented by the NOUs on the various processing cores. The layer diagram also includes a NoC layer 554 which is implemented by the network interface units, routers, and routing hardware of the multi-processor core. Using the approaches disclosed herein, the computation layer 551 can be divorced from low level data movement tasks. In specific embodiments of the invention, interface 553 does not need any information regarding the destination for or source of data exchanged over the interface. Using specific embodiments, the computation layer 551 can be isolated from any work associated with tracking and executing the transmission of data to specific cores. Furthermore, in specific embodiments of the invention, the network overlay layer can reformat data in transit between the computation layer on different processing cores such that the data is delivered to the processing core in the correct format without the processing core even needing to know what format the data was originally in before it was transmitted, without the processing core needing to use computation resources to do the reformatting, and without the processing core even needing to be capable of doing the reformatting. For example, in specific embodiments of the invention, data is transferred over interface 553 to NoC overlay layer 552 on one processing core in one format and is delivered back over interface 553 to computation layer 551 on a different processing core in a different format such that the different processing core does not need to operate on data in the first format.

In specific embodiments of the invention, a multicore processor includes various layers implemented by different hardware components. The multicore processor could include a computation layer 551, for conducting computations using a set of processing cores in the multicore processor, with executable instructions for the set of processing pipelines in the set of processing cores, wherein the executable instructions for the set of processing pipelines in the set of processing cores are executed by the set of core controllers. The processing pipelines could be the processing pipelines in processing cores 501, 502, 503, and 504. The core controllers could be the core controllers 521, 522, 523, and 524. The instructions could be stored in the memories on processing cores 501, 502, 503, and 504. The multicore processor could also include a network-on-chip layer 554, for connecting the set of processing cores in the multicore processor, with executable instructions for the set of routers and the set of network interface units of the processing cores. The network interface units could be the network interface units in processing cores 501, 502, 503, and 504. The routers could be routers 511, 512, 513, and 514. The executable instructions could be hardcoded into the hardware, written into firmware, and/or be configurable by the network overlay layer.

In specific embodiments of the invention, the multicore processor could also include the capability to reformat data in transit from one processing core to another. The functionality could be implemented using the same hardware used to implement the NoC overlay layer or by separate hardware. The hardware could be a set of programmable controllers, with executable instructions for reformatting computational data from the computation layer for transmission through the network-on-chip layer, wherein each processing core in the set of processing cores has a programmable controller from the set of programmable controllers. The hardware could also include data reformatting blocks under the control of the programmable controllers. The programmable controllers could be part of a set of dedicated hardware components such as dedicated hardware components 531, 532, 533, and 534. However, the programmable controllers could also be dedicated hardware which controlled data formatting blocks located at the ends of the computation pipelines which reformat data as it is received and prior to storing it in memory.

In specific embodiments of the invention, the reformatting of data discussed herein can be conducted by various different elements and at various different times. For example, the reformatting of data could be conducted by dedicated hardware for reformatting. The dedicated hardware could be entirely separate from the hardware used to execute instructions for the computations being conducted by the computation layer. The dedicated hardware could be dedicated controllers, such as dedicated firmware controllers, which control data formatting blocks in the processing cores. As another example, the same hardware that implements the NoC overlay layer could be used for reformatting data. In specific embodiments of the invention, the computational data can be reformatted between when it is made available on a memory of a first processing core and when it is delivered to a memory on a second processing core in a multicore processor. The memories on the first and second processing cores can be the main memories of their associated processing cores. The data formatting blocks could be configured to reformat data in the memory prior to being transmitted off of the processing core, reformat data received from outside the processing core prior to being stored in the memory, reformat data taken from the memory and prior to being restored back in the memory, reformat data in the memory in transit to the processing pipeline, or reformat data from the processing pipeline in transit to being stored in the memory.

The NoC overlay layer could be in communication with both the computation layer and the network-on-chip layer, administrate a network-on-chip overlay graph for administrating the exchange of data among the cores of the multicore processor, and include the executable instructions for reformatting computational data from the computation layer for transmission through the network-on-chip layer. The NoC overlay layer could be hardware-instantiated via a set of programmable controllers in the multicore processor. The instructions for reformatting the computational data from the computation layer could be the instructions executed by the NOUs such as those that can be used in place of dedicated hardware components 531, 532, 533, or 534. The instructions could be loaded into programmable controllers on the NOUs. The instructions could be loaded into firmware controllers on the NOUs. The instructions could be executed without using the pipelines or the processing cores and could be executed without using the core controllers of the processing cores such that the resources of the computation layer could be preserved and isolated from data reformatting tasks. The programmable controllers could execute the executable instructions for reformatting computational data from the computation layer without using the computation layer and asynchronously to the execution of the executable instructions for the set of processing pipelines that represent the complex computation being conducted by the computation layer. The network-on-chip overlay graph and the reformatting of data could execute asynchronously from the execution of the programmable instructions by the computation layer. In alternative embodiments in which dedicated hardware was provided for reformatting which was separable from the administration of the NoC overlay layer, the reformatting could likewise execute asynchronously from both the execution of instructions by the computation layer and the execution of instructions by the NoC overlay layer similar fashion.

In specific embodiments of the invention, the data reformatting can take on various characteristics and be conducted in various ways. The reformatting of computational data can include at least one of changing a data type of the computational data and changing a number of data elements used to represent the computational data. For example, a data type of computational data can be changed in transit by changing the data type from floating point to integer or from 4-bit integer to 8-bit integer. As another example, a number of data elements used to represent the computational data can be changed in transit by changing the number of data elements from two 8-bit data element to a single 16-bit data element. As another example, two 4-bit integers can be used to represent a single 8-bit integer. The reformatting can be conducted by down sampling a high bit datum using liner interpolation, max pooling, random sampling, compression, or some other method of reducing the size of a data element while preserving the data.

In specific embodiments, dedicated hardware, such as the programmable controllers mentioned above and/or data reformatting blocks, can reformat the computational data. The dedicated hardware can be a part of or separate from the hardware that implements the NoC overlay layer. The data reformatting blocks can consist of a set of registers, buffers, and logic gates to reformat incoming computation data by changing the type or number of data elements used to represent the computation data. The data reformatting blocks can conduct various reformatting operations based on instructions provided to the data reformatting blocks. The instructions can be provided by the programmable controllers mentioned above. The instructions can place the data reformatting blocks into a state in which data delivered to the input of the block is automatically reformatted in a manner defined by that state. The data reformatting blocks can be a set of data reformatting blocks and can be individually and operatively coupled to the processing pipelines in the set of processing pipelines in the processing cores. The data reformatting blocks can be blocks with inputs connected to the outputs of the computation pipelines and can be configured to pass through data when it does not need to be reformatted and reformat data when it does need to be reformatted, on the way to the memory on the processing core. As such, the data reformatting blocks could be part of the pipeline blocks on the processing cores 501, 502, 503, and 504 in FIG. 5. Alternatively, the data reformatting blocks can be coupled to the crossbar bus illustrated in FIG. 5 and convert data that is delivered from the memory prior to being provided to the routers for transmission to another processing core.

Specific benefits accrue to the embodiments in which the dedicated hardware is not administrated by the computation layer, and in embodiments in which the NoC overlay layer reformats the computational data, in that the computation layer is further shielded from data administration tasks. Furthermore, in specific embodiments, the processing cores themselves can be dramatically simplified in that they do not need to contain kernels for different kinds of data types or for data elements of disparate sizes while still being able to cooperate with processing cores that have different kernel sets. In these embodiments, different processing cores in a multicore processor can effectively specialize in operations that use different data types and have a more manageable kernel set while the overall multicore processor maintains the ability to conduct operations on various data types and formats. These embodiments can be used in combination with compilers that are made aware of the kernel sets of the various processing cores for which they are compiling data, and that divide up computations so that specific processing cores are only assigned computations that they are designed to execute. In these embodiments, processing cores can be designed with kernels that do not need to reformat or otherwise rearrange computation data before executing computations.

In specific embodiments of the invention, different processing cores in the multicore processors disclosed herein can have simplified kernel sets. The simplified kernel sets can be designed to only operate with data of a specific format or subset of potential formats as compared to all the data formats that the multicore processor is configured to operate on. The simplified kernel sets can also be designed to not require the manipulation of input data elements into different sized data elements. The aforementioned simplified kernel sets can be used because the programmable controllers and/or data reformatting blocks described herein can be configured to assure that data is provided for access by the kernels in the format they are designed to operate on. The reformatting can also be conducted in transit so that specific processing cores can be designed, through the provisioning of specific kernel sets or otherwise, to operate on specific data formats while other processing cores are designed to operate with other data formats. Accordingly, in specific embodiments, a multicore processor can include a first set of kernels on the first processing core for conducting computations using data in the first format, and a second set of kernels on the second processing core for conducting computations using data in the second format. The first processing core does not have kernels for conducting computations using data in the second format, and the second processing core does not have kernels for conducting computations using data in the first format.

In specific embodiments, instructions can be loaded into programmable controllers on the processing cores to execute data reformatting. The instructions can be loaded into the programmable controllers to execute data reformatting. The instructions can be loaded into firmware controllers. The actual formatting of data can be conducted by data reformatting blocks that are controlled by the programmable controllers. The instructions can be generated by a compiler. In specific embodiments, the compiler can also generate instructions for the computation layer to execute a complex computation and for the NoC overlay layer to execute the application data flow graph. The complier can be any of the compilers disclosed in U.S. patent application Ser. No. 17/163,124, filed Jan. 29, 2021, which is incorporated by reference herein in its entirety for all purposes, where the compiler has additionally been augmented to generate instructions for reformatting computation data in transit as is described herein. The instructions to implement the NoC overlay layer and to reformat the data (if separate) can be designed by the compiler to be executed in response to events exchanged at layers below the computation layer and asynchronously to the execution of the instructions for the computation layer to execute the complex computation. In specific embodiments, the NoC overlay layer includes executable instructions for an application data flow graph, and a single compiler generates: the executable instructions for the set of processing pipelines, the executable instructions for the set of routers and the set of network interfaces, the executable instructions for the application data flow graph, and the executable instructions for reformatting the computational data from the computational layer. This single compiler can assure that each of the various aspects of the system that need to operate asynchronously can do so while still assuring that the correct actions are taken with respect to each element of data in the system at the right time. For example, the compiler can assure that data delivered to a first processing core by an execution of an instruction for the application data flow graph can be delivered to a data formatting block in time for an event to trigger the appropriate reformatting of the data by that data formatting block, which in turn is conducted in time for an event or pull data request response to inform the computation layer that the properly formatted data is available to conduct a computation upon.

Figure 6:
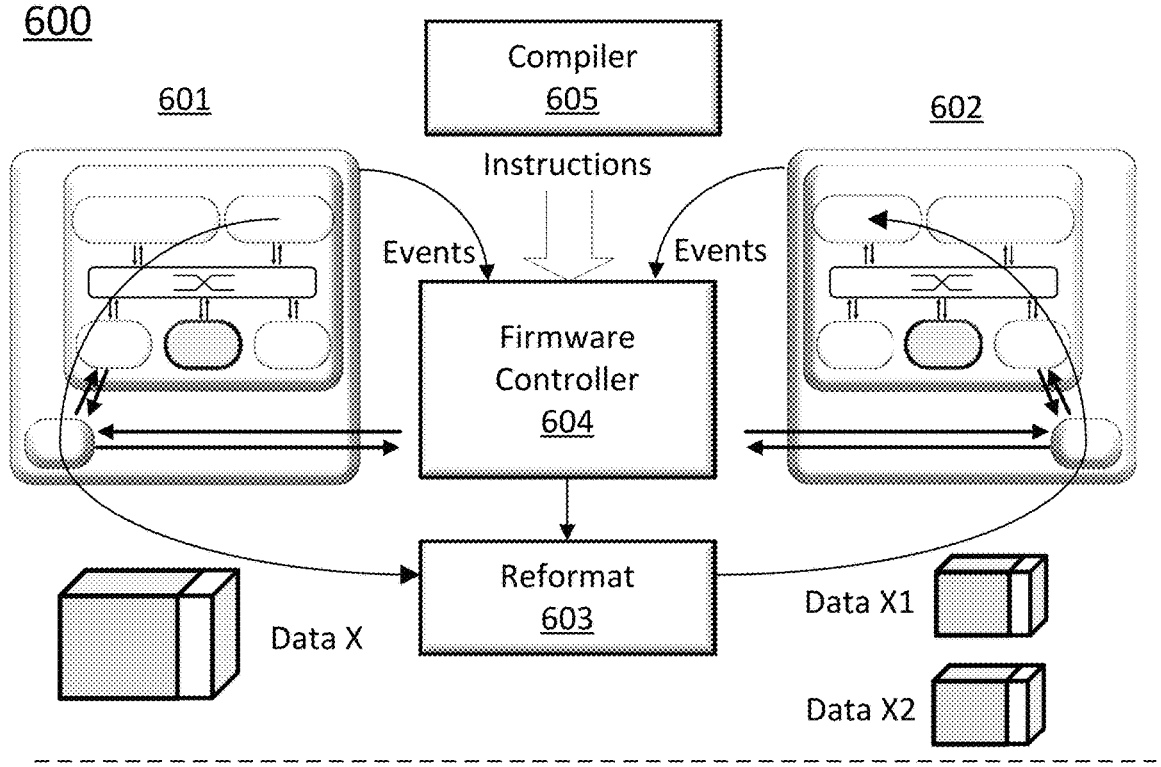
FIG. 6 includes two block diagrams with overlain data flow diagrams in accordance with specific embodiments of the invention disclosed herein.
Figure 6:
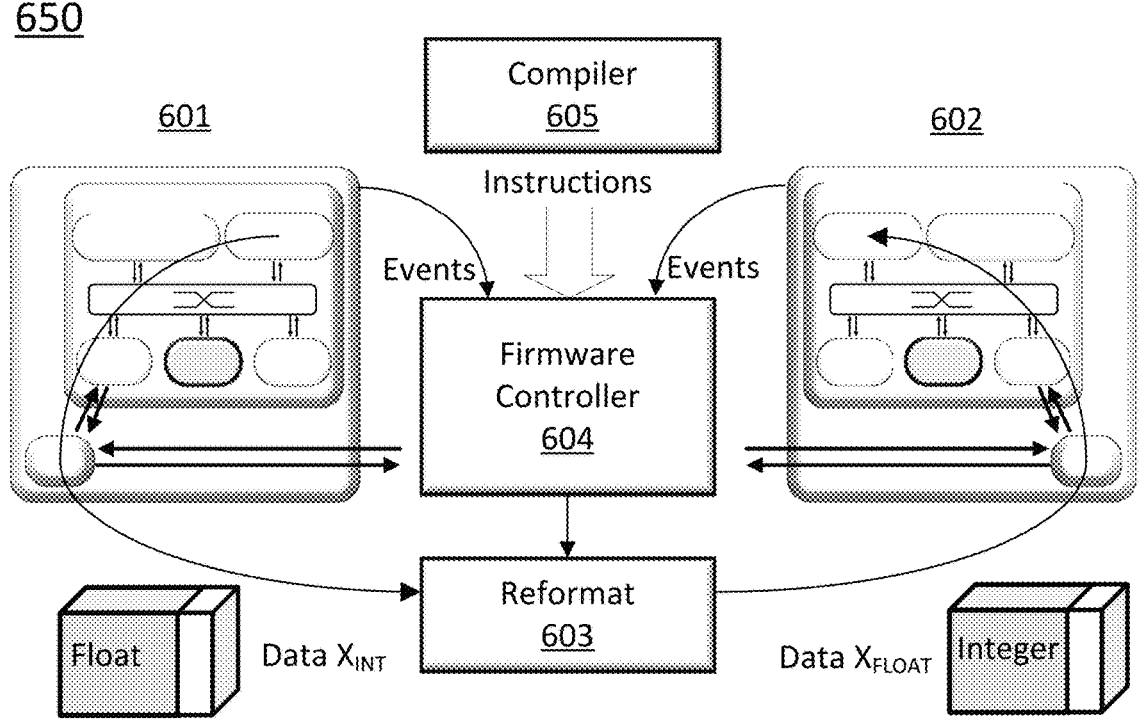

FIG. 6 includes two block diagrams with overlain data flow diagrams in accordance with specific embodiments of the invention disclosed herein. Block diagram 600 includes a first processing core 601 and a second processing core 602. The processing cores can be processing cores in a multicore processor that are connected by a NoC. Data can be transferred, as shown by the data flow diagram, from a memory on the first processing core in a first format such as Data X, and be reformatted in transit by a data reformatting block 603, before being delivered to the memory on the second processing core 602. As illustrated in block diagram 600, the data can be reformatted by being broken into differently sized data elements such as going from Data X of 50 kilobytes to Data X1 of 25 kilobytes and Data X2 of 25 kilobytes. The two data elements in this example Data X1 and Data X2 could be buffered separately on the memory of processing core 602. The memories on the two processing cores could be the main memories of the processing cores. As illustrated in block diagram 650, the data can alternatively be reformatted by being converted into a different data type such as going from Data $X_{INT}$ in integer format to Data $X_{FLOAT}$ in a floating-point format.

The reformatting of computation data illustrated in the data flow diagrams of FIG. 6 can be conducted by data reformatting block 603 in accordance with instructions executed by firmware controller 604. The instructions can, in turn, be executed in response to events provided by the components of the processing cores. The events can be used to trigger the stepping through of specific instructions as described above with reference to the execution of the instructions for a NoC overlay graph. The instructions can be provided by a compiler 605. The compiler 605 can be the same compiler that generates the instructions for the computation pipelines on the first processing core and the second processing core. Accordingly, the compiler can assure that when Data X is generated by the execution of a computation instruction on processing core 601, that data reformatting block 603 is queued to execute the appropriate data conversation needed to translate Data X into Data X1 and Data X2. The events can include an indication that an instruction was completed by the processing core, that data has been stored in a memory of the processing core, that data has been received by a router of the processing core, that data has been transmitted using a router of the processing core, and any other events associated with the movement, availability, and need for data by the various components of the multicore processor.

While the data reformatting block 603 and firmware controller 604 are drawn as separate elements in the block diagrams, both elements could be implemented in either the first processing core, the second processing core, or on separate hardware. For example, the data reformatting block 603 could be connected to an output of the computation pipeline on first processing core 601 or to an input of the computation pipeline on second processing core 602. As another example, the data reformatting block 603 could be connected to a cross bar or bus in the first processing core and be designed to retrieve data from the main memory, reformat the data, and return the data to the main memory to be transmitted to the second processing core. Similarly, the data reformatting block 603 could be connected to a cross bar or bus in the second processing core and be designed to retrieve data from the memory when it is delivered, reformat the data, and return the data to the main memory to be accessed by the processing pipeline on the second processing core.

In specific embodiments of the invention, first processing core 601 can have a first set of kernels and second processing core 602 can have a second set of kernels. First processing core 601 can have a set of kernels, stored in the memory on the first processing core 601, that are compatible with data in the format of Data $X_{INT}$. Second processing core 602 can have a set of kernels, stored in the memory on the second processing core 602, that are compatible with data in the format of Data $X_{FLOAT}$. Furthermore, the set of kernels in first processing core 601 may be incompatible with the format of Data $X_{FLOAT}$ and the set of kernels in second processing core 602 may be incompatible with the format of Data $X_{INT}$. In such an embodiment, the overall multicore processor would be able to conduct computations using both types of data while the kernel set on each individual processing core could be strategically simplified. In specific embodiments of the invention, the same compiler that generates the instructions for the complex computation and for reformatting the computation data in transit, could also assign specific kernels to the processing cores. In the alternative, or in combination, the same compiler could be provided with information regarding which kernels were in which processing core as an input to the compiler. First processing core 601 could have a set of kernels with a kernel that is designed to generate output computation data in the form of data elements having the size of Data X while second processing core 602 could have a set of kernels that are designed to accept computation data with data elements having the size of Data X1 and Data X2 and does not have a kernel that is designed to accept computation data with data elements having the size of Data X.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the example of an API was used throughout the disclosure as an example of an interface between layers, simpler interfaces are possible including any that involve the transmission of information between layers of a computerized system that can be logically resolved by the receiving layer. Furthermore, although a NoC interconnecting processing cores in a multicore processor was used as an exemplary environment, other implementations are possible. For example, the embodiments disclosed herein could be applied to any network of computational nodes or functional blocks such as the various interoperating elements of large-scale systems-on-a-chip (SoC) devices. As another example, the embodiments disclosed herein could be applied to functional blocks or computational nodes connected by any interconnect fabric as opposed to the types of networks used for NoCs. As another example, the various computational nodes or functional blocks and the network itself can be implemented on a single chip system, in a multichip single package system, or in a multichip multi-package system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. In two specific examples, the network and computational nodes or functional blocks could all be implemented on a single full wafer-scale system or they could be implemented on individual chiplets connected via an interposer. Furthermore, the disclosure should not be limited to any specific type of complex computation being executed on a multicore processor as the programming of and execution of any complex computation can be aided by specific embodiments disclosed herein including training or drawing an inference from an artificial neural network, or executing a hashing, encryption, decryption, or graphics rendering algorithm involving a large number of component computations. Furthermore, the examples of the NoC overlay layer logically isolating the computation layer from the NoC layer should not be interpreted to exclude systems in which a multicore processor can be placed in a debugging mode, or similar mode of operation, in which the continuous execution of a complex computation is stalled and the hardware or software otherwise associated with the computation layer can have a direct impact on the NoC layer without communicating with the NoC overlay layer. These and other modifications and variations to the present invention may be practiced by those skilled in the art, without departing from the scope of the present invention, which is more particularly set forth in the appended claims.

What is claimed is:

1. A multicore processor stack, stored on non-transitory computer readable media in a multicore processor, comprising:
   a computation layer, for conducting computations using a set of processing cores in the multicore processor, with executable instructions for a set of processing pipelines in the set of processing cores;
   a network-on-chip layer, for connecting the set of processing cores in the multicore processor, with executable instructions for a set of routers and a set of network interface units in the multicore processor;
   a set of programmable controllers, with executable instructions for reformatting computational data from the computation layer for transmission through the network-on-chip layer, wherein each processing core in the set of processing cores has a programmable controller from the set of programmable controllers; and
   a NoC overlay layer that logically isolates the computation layer and the network-on-chip layer.

2. The multicore processor stack of claim 1, wherein:
   reformatting computational data includes at least one of changing a data type and changing a number of data elements used to represent the computational data.

3. The multicore processor stack of claim 1, further comprising:
   a set of data reformatting blocks, wherein the reformatting blocks in the set of data reformatting blocks are individually and operatively coupled to corresponding processing pipelines in the set of processing pipelines; and
   wherein the set of data reformatting blocks reformat the computational data in response to an execution of the executable instructions for reformatting the computational data by the set of programmable controllers.

4. The multicore processor stack of claim 1, further comprising:

a set of main memories, wherein each processing core in the set of processing cores has a main memory from the set of main memories; and a set of data reformatting blocks, wherein the reformatting blocks in the set of data reformatting blocks are individually and operatively coupled to corresponding memories in the set of main memories; and wherein the set of data reformatting blocks reformat the computational data in response to an execution of the executable instructions for reformatting the computational data by the set of programmable controllers.

5. The multicore processor stack of claim 1, wherein: the programmable controllers are firmware controllers.

6. The multicore processor stack of claim 1, wherein the NoC overlay layer is hardware-instantiated via the set of programmable controllers and logically isolates the computation layer from the network-on-chip layer in that:

the programmable controllers execute the executable instructions for reformatting computational data from the computation layer without using the computation layer and asynchronously to an execution of the executable instructions for the set of processing pipelines.

7. The multicore processor stack of claim 1, wherein:
the NoC overlay layer includes executable instructions for an application data flow graph; and
a single compiler generates the executable instructions for the set of processing pipelines, the executable instructions for the set of routers and the set of network interface units, the executable instructions for the application data flow graph, and the executable instructions for reformatting the computational data from the computation layer.

8. The multicore processor stack of claim 1, wherein:
the computation layer and the NoC overlay layer are communicatively connected via an interface; and
the interface is an application programming interface.

9. The multicore processor stack of claim 8, wherein:
the interface includes a pull message.

10. The multicore processor stack of claim 1, wherein:
the NoC overlay layer distributively instantiates a network-on-chip overlay graph across the set of processing cores; and
a path of the network-on-chip overlay graph begins on a first processing core and terminates with a pull computation data API call response on a second processing core.

11. The multicore processor stack of claim 10, wherein the NoC overlay layer logically isolates the computation layer from the network-on-chip layer in that:
the NoC overlay layer implements the path of the network-on-chip overlay graph asynchronously to a pull computation data API call corresponding to the pull computation data API call response.

12. The multicore processor stack of claim 10, wherein:
the network-on-chip overlay graph is configurable via an application programming interface.

13. The multicore processor stack of claim 1, wherein:
the NoC overlay layer distributively instantiates a network-on-chip overlay graph across the set of processing cores; and
the network-on-chip overlay graph is configured via a compiler offline.

14. The multicore processor stack of claim 1, wherein:
the NoC overlay layer distributively instantiates a network-on-chip overlay graph across the set of processing cores; and the network-on-chip overlay graph is configured by a runtime system during an application execution.

15. A multicore processor comprising:
a set of processing cores;
a set of processing pipelines, wherein each processing core in the set of processing cores has a processing pipeline from the set of processing pipelines;
a set of core controllers, wherein each processing core in the set of processing cores has a core controller from the set of core controllers;
a set of routers, wherein each processing core in the set of processing cores has a router from the set of routers;
a set of network interface units, wherein each processing core in the set of processing cores has a network interface unit from the set of network interface units;
a computation layer, for conducting computations using the set of processing cores in the multicore processor, with executable instructions for the set of processing pipelines in the set of processing cores, wherein the executable instructions for the set of processing pipelines in the set of processing cores are executed by the set of core controllers;
a network-on-chip layer, for connecting the set of processing cores in the multicore processor, with executable instructions for the set of routers and the set of network interface units; and
a set of programmable controllers, with executable instructions for reformatting computational data from the computation layer for transmission through the network-on-chip layer, wherein each processing core in the set of processing cores has a programmable controller from the set of programmable controllers.

16. The multicore processor of claim 15, further comprising:
a NoC overlay layer that: (i) is in communication with both the computation layer and the network-on-chip layer; (ii) administrates a network-on-chip overlay graph for administrating an exchange of data among the processing cores of the multicore processor; and (iii) includes the executable instructions for reformatting computational data from the computation layer for transmission through the network-on-chip layer; and
wherein the network-on-chip overlay graph executes asynchronously from the execution of the executable instructions by the computation layer.

17. A multicore processor stack, stored on non-transitory computer readable media in a multicore processor, comprising:
a computation layer, for conducting computations using a set of processing cores in the multicore processor, with executable instructions for a set of processing pipelines in the set of processing cores;
a network-on-chip layer, for connecting the set of processing cores in the multicore processor, with executable instructions for a set of routers and a set of network interface units in the multicore processor; and
a NoC overlay layer that logically isolates the computation layer and the network-on-chip layer;
wherein the NoC overlay layer is hardware-instantiated via a set of programmable controllers in the multicore processor, wherein each processing core in the set of processing cores has a programmable controller from the set of programmable controllers; and
wherein the set of programmable controllers reformat computational data from the computation layer for transmission through the network-on-chip layer.

18. A multicore processor stack, stored on non-transitory computer readable media in a multicore processor, comprising:
- a computation layer, for conducting computations using a set of processing cores in the multicore processor, with executable instructions for a set of processing pipelines in the set of processing cores;
- a network-on-chip layer, for connecting the set of processing cores in the multicore processor, with executable instructions for a set of routers and a set of network interface units in the multicore processor;
- a NoC overlay layer that logically isolates the computation layer and the network-on-chip layer;
- a set of programmable controllers, with executable instructions for reformatting computational data from the computation layer for transmission from a first memory on a first processing core in the multicore processor to a second processing core in the multicore processor, wherein the executable instructions convert the computational data from a first format to a second format;
- a first set of kernels on the first processing core for conducting computations using data in the first format; and
- a second set of kernels on the second processing core for conducting computations using data in the second format;
- wherein the first processing core does not have kernels for conducting computations using data in the second format; and
- wherein the second processing core does not have kernels for conducting computations using data in the first format.

* * * * *